United States Patent
Kunisada et al.

(10) Patent No.: US 9,009,936 B2
(45) Date of Patent: Apr. 21, 2015

(54) BELT ATTACHMENT JIG

(71) Applicant: Bando Chemical Industries, Ltd., Hyogo (JP)

(72) Inventors: Takashi Kunisada, Kobe (JP); Hideaki Kawahara, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 14/222,627

(22) Filed: Mar. 22, 2014

(65) Prior Publication Data

US 2014/0274509 A1    Sep. 18, 2014

Related U.S. Application Data

(63) Continuation of application No. PCT/JP2012/004826, filed on Jul. 30, 2012.

(30) Foreign Application Priority Data

Sep. 22, 2011  (JP) .................................. 2011-206836

(51) Int. Cl.
*B23P 19/02* (2006.01)
*F16H 7/24* (2006.01)
*F16H 7/08* (2006.01)

(52) U.S. Cl.
CPC ... *F16H 7/24* (2013.01); *F16H 7/08* (2013.01)

(58) Field of Classification Search
USPC .......................................... 29/235, 700, 240
See application file for complete search history.

(56) References Cited

U.S. PATENT DOCUMENTS

| 8,241,159 B2 * | 8/2012 | Iwata ............................ 474/130 |
| 2003/0176248 A1 * | 9/2003 | De Meester et al. .......... 474/130 |
| 2008/0155803 A1 | 7/2008 | Iwata |

FOREIGN PATENT DOCUMENTS

| JP | 2006-300172 A | 11/2006 |
| JP | 2007-120678 A | 5/2007 |
| JP | 2008-164053 A | 7/2008 |
| JP | 2009-115150 | * 5/2009 | ............... F16H 7/24 |
| JP | 2009-115150 A | 5/2009 |
| JP | 2010-091076 A | 4/2010 |

OTHER PUBLICATIONS

International Search Report; PCT/JP2012/004826; Sep. 25, 2012.

* cited by examiner

*Primary Examiner* — Lee D Wilson
*Assistant Examiner* — Shantese McDonald
(74) *Attorney, Agent, or Firm* — Studebaker & Brackett PC (57) ABSTRACT

A belt attachment jig includes a jig body positioned such that a side surface faces a side surface of a pulley, and a belt guide portion located at one end of the side surface of the jig body and protruding along a circumference of the pulley, and having, in a surface on a base side, a holding surface for holding a belt. The belt guide portion being configured to guide the belt onto the holding surface and lead the belt out to a lateral side of the pulley, when fitted in a pulley groove of the pulley. The holding surface has a top at a portion on a side closer to the jig body, and is tilted obliquely downward in radial directions from the top and is curved in an inverted U shape along a lead-out direction of the belt so that an inner circumferential surface of the belt faces the jig body.

13 Claims, 10 Drawing Sheets

FIG.10

BELT ATTACHMENT JIG

CROSS-REFERENCE TO RELATED APPLICATIONS

This is a continuation of International Application No. PCT/JP2012/004826 filed on Jul. 30, 2012, which claims priority to Japanese Patent Application No. 2011-206836 filed on Sep. 22, 2011. The entire disclosures of these applications are incorporated by reference herein.

BACKGROUND

The present disclosure relates to belt attachment jigs configured to attach a belt to a plurality of pulleys by wrapping the belt around the pulleys, and specifically relates to measures for preventing detachment of the belt from the belt attachment jig and damage of the belt.

In general, belt drive systems in which a belt is wrapped around a plurality of pulleys each having a pulley groove on its outer circumferential surface include a tension applying means, such as an auto tensioner, which applies a predetermined tension to the belt after the belt is looped over all of the pulleys.

To avoid the provision of such a tension applying means, there is a belt which, when attached to a plurality of pulleys, is extended in a circumferential direction of a pulley and made to pass over a flange of the pulley. Further, a belt attachment jig for attaching such a belt to a pulley has been suggested.

In the case for example where a belt is wrapped around two pulleys, the belt attachment jig is used in such a manner that the belt is looped over one of the two pulleys, and in this state, remaining part of the belt is wound around the belt attachment jig and the belt attachment jig is attached to the other pulley. In this attachment state, a belt portion located on the rear side of the belt attachment jig in the pulley rotational direction is fitted in the pulley groove, and a belt portion located on the forward side of the belt attachment jig in the pulley rotational direction is bent from the outer circumferential surface of the pulley and led out laterally to a near side of the pulley. Accordingly, part of the belt attachment jig is sandwiched between the belt and the pulley groove. The phrase "near side" as used in this specification refers to the side closer to an operator who is attaching the belt, and the phrase "back side" refers to the side opposite to the side closer to the operator.

The belt attachment jig in this attachment state is moved forward in the pulley rotational direction by rotating the center bolt of the jig-attached pulley with a wrench, etc., to gradually increase the area of the belt which is fitted in the pulley groove, and make the belt completely wrapped around the jig-attached pulley in the end.

For example, Patent Document 1 (Japanese Unexamined Patent Publication No. 2006-300172) discloses a belt attachment jig having a fixing means which fixes the belt attachment jig to a pulley until the belt is fitted in a pulley groove, and a holding surface which holds part of the belt at outside the pulley in an axial direction of the pulley near a pulley flange. The holding surface is flush with the outer circumferential surface of the pulley flange, and holds part of the belt until the belt, which is bent in a belt width direction by rotation of the pulley, is fitted in the pulley groove due to its restoring force.

SUMMARY

In the case where the belt attachment jig disclosed in Patent Document 1 is attached to a pulley to wrap the belt around the pulley, part of the belt needs to be held on the holding surface so that a belt portion located on the forward side of the holding surface in the pulley rotational direction is bent from the outer circumferential surface of the pulley and led out laterally to the near side of the pulley.

However, the holding surface of this belt attachment jig is flush with the outer circumferential surface of the pulley flange. Therefore, the belt needs to be relatively significantly bent in the belt width direction on the holding surface in order to attach the belt attachment jig to the pulley. When the belt is attached in this manner, the bent part of the lead-out portion of the belt is locally compressed at its near-side portion in the belt width direction, and is tensioned at its back-side portion in the belt width direction. As the belt in this state is wrapped around the jig-attached pulley by rotating the pulley, the compressive force and the tensile force applied to the bent part of the lead-out portion of the belt are further increased due to the tension applied by the wrapping of the belt. This may cause damage to the belt.

Further, in the case where the holding surface is flush with the outer circumferential surface of the pulley flange, as disclosed in Patent Document 1, the belt on the belt attachment jig is pulled strongly toward the near side due to the tension applied by the wrapping of the belt, and may slip on the holding surface and may be even detached from the belt attachment jig.

The present disclosure is thus intended to prevent detachment of the belt from the belt attachment jig and damage of the belt due to local compression and tension, in attaching the belt to a plurality of pulleys.

To achieve the above objective, in a belt attachment jig of the present disclosure, a holding surface for holding a belt has an improved shape which allows the belt to be wound around the belt attachment jig in a positive bending state and makes it possible for the belt to be smoothly led out to a lateral side of the pulley while holding the belt on the holding surface.

Specifically, the present disclosure is directed to a belt attachment jig including: a jig body positioned such that a side surface thereof faces a side surface of a pulley, and a belt guide portion located at one end of the side surface of the jig body and protruding along a circumference of the pulley, and having, in a surface on a base side thereof, a holding surface for holding a belt, the belt guide portion being configured to guide the belt onto the holding surface and lead the belt out to a lateral side of the pulley, when fitted in a pulley groove of the pulley, and the belt attachment jig being used for wrapping the belt around at least two pulleys in a tight tension and attaching the belt to one of the at least two pulleys by fitting the belt guide portion in the pulley groove of the one pulley and holding the belt on the holding surface, with the belt looped over the other pulley, and by fitting the belt in the pulley groove by moving the belt attachment jig in a pulley rotational direction together with the belt as the pulley is rotated. The present disclosure includes the following means.

That is, the first aspect of the present disclosure is characterized in that the holding surface has a top at a portion on a side closer to the jig body, and is tilted obliquely downward in radial directions from the top and is curved in an inverted U shape along a lead-out direction of the belt so that an inner circumferential surface of the belt faces the jig body.

The second aspect of the present disclosure is characterized in that in the belt attachment jig of the first aspect of the present disclosure, a belt-lead-out side edge of the holding surface forms a belt bending reducing surface which is tilted downward toward a belt lead-out side and reduces bending of a lead-out portion of the belt held on the holding surface.

The third aspect of the present disclosure is characterized in that in the belt attachment jig of the first or second aspect of the present disclosure, a belt-lead-out side edge of the jig body at a protrusion base of the belt guide portion forms a side-surface contact portion with which a side surface of the belt on a rear side in the pulley rotational direction comes in contact, and along which the side surface of the belt is aligned, when the belt is guided by the belt guide portion and led out to the lateral side of the pulley.

The fourth aspect of the present disclosure is characterized in that in the belt attachment jig of any one of the first to third aspects of the present disclosure, the jig body includes a position maintaining portion provided at the protrusion base of the belt guide portion and protruding forward in the pulley rotational direction along a side surface of the pulley, the position maintaining portion being apart from the belt guide portion in a direction of a rotational axis of the pulley, with a space between the position maintaining portion and the belt guide portion, and holding the belt guided into the space, between the position maintaining portion and the side surface of the pulley, such that the inner circumferential surface of the belt faces the pulley.

The fifth aspect of the present disclosure is characterized in that in the belt attachment jig of the fourth aspect of the present disclosure, the position maintaining portion is in an arc shape along a rim of the pulley.

The sixth aspect of the present disclosure is characterized in that in the belt attachment jig of any one of the first to fifth aspects of the present disclosure, the jig body includes a belt sandwiching portion that is apart from the belt guide portion in the direction of the rotational axis of the pulley, with a space between the belt sandwiching portion and the belt guide portion, and sandwiches the belt inserted in the space, between the belt sandwiching portion and the belt guide portion.

The seventh aspect of the present disclosure is characterized in that in the belt attachment jig of the first to sixth aspects of the present disclosure, the jig body includes a belt receiving portion located around the rotational axis of the pulley on the belt lead-out side, and receiving part of the belt guided by the belt guide portion and led out to the lateral side of the pulley, on a surface facing radially outside the pulley.

The eighth aspect of the present disclosure is characterized in that in the belt attachment jig of any one of the first to seventh aspects of the present disclosure, the pulley groove of each of the pulleys includes a plurality of pulley grooves arranged in parallel with each other, and each of the pulley grooves is in a V shape having a decreasing width from an open end to a bottom end, the belt guide portion has, on a back surface thereof, a plurality of engagement protrusions which engage with the pulley grooves, and each of the engagement protrusions has a triangular or trapezoidal cross section to correspond to each of the pulley grooves.

The ninth aspect of the present disclosure is characterized in that in the belt attachment jig of any one of the first to eighth aspects of the present disclosure, the pulley to which the belt attachment jig is attached is a pulley with a flange, and the flange of the jig-attached pulley has a trapezoidal cross section with a decreasing width from a base end to a top end, and an engagement groove which sandwiches and engages with the flange of the jig-attached pulley is formed between the one end of the jig body and the surface on the base side of the belt guide portion.

According to the first aspect of the present disclosure, the holding surface of the belt attachment jig for holding the belt has a top at a portion on a side closer to the jig body, and is tilted obliquely downward in radial directions from the top, and the holding surface is curved into an inverted U shape along a lead-out direction of the belt. When the belt is held on the holding surface forming such a curved surface, the inner circumferential surface of the belt faces toward the jig body on the holding surface, and the belt is curved into a positive bending state in which the belt is curved along the belt lengthwise direction, following the curved surface of the holding surface, and is led out laterally to the near side of the pulley. Therefore, it is possible to reduce bending of the belt in the belt width direction in the state where the belt is led out to the near side of the pulley. As a result, it is possible to prevent the compressive force and the tensile force from being locally applied to the bent part of the lead-out portion of the belt.

Since the holding surface is upwardly tilted toward the jig body, the belt held on the holding surface is pushed against the holding surface and hung thereon, even when the belt is wrapped around the pulleys by rotating the jig-attached pulley and is led out laterally to the near side of the pulley due to the tension applied to the belt as the belt is wrapped around. Thus, the belt can be reliably held on the holding surface, and prevented from being detached from the belt attachment jig to the near side of the pulley.

It is therefore possible to prevent the belt from being detached from the belt attachment jig and damaged by local compression and tension while the belt is attached to a plurality of pulleys.

According to the second aspect of the present disclosure, the belt-lead-out side edge of the holding surface forms a belt bending reducing surface which is tilted downward toward the belt lead-out side. Thus, the belt bending reducing surface allows the belt to be bent from the holding surface and to be smoothly led out to the lateral side of the pulley, without causing intense bending of the belt. As a result, strain concentration in the belt is prevented as the belt is wrapped around the pulleys, and it is possible to prevent damage of the belt.

According to the third aspect of the present disclosure, the belt lead-out side of the jig body forms a side-surface contact portion along which a side surface of the belt is aligned. The side-surface contact portion enables positioning of the belt guided by the belt guide portion and led out to the lateral side of the pulley. In wrapping the belt around pulleys, the belt is pushed forward in the pulley rotational direction as the pulley is rotated, with the side surface of the belt supported on the side-surface contact portion. Therefore, the belt is not easily folded or significantly deformed. As a result, damage of the belt can be further prevented.

According to the fourth aspect of the present disclosure, the jig body includes a position maintaining portion protruding forward in the pulley rotational direction, and the belt guided into the space between the position maintaining portion and the belt guide portion is held between the position maintaining portion and the side surface of the pulley such that the inner circumferential surface of the belt faces the pulley. Accordingly, a portion of the belt which is not yet wrapped around the pulley groove is in a state in which one side of the belt in its width direction that is to be delivered to the near side on the outer circumferential surface of the pulley is closer to the rotational axis of the pulley than the other side of the belt in its width direction that is to be delivered to the back side on the outer circumferential surface of the pulley. Thus, a portion of the belt which is located on the near side of the other pulley, to which the belt is delivered from the jig-attached pulley, firmly engages with the pulley groove of the other pulley. As a result, the belt is prevented from being detached from the other pulley.

The belt is also reliably prevented from being twisted, and therefore prevented from being damaged, on the lateral side of the jig-attached pulley where the belt tends to be twisted due to sliding during rotation of the jig-attached pulley.

According to the fifth aspect of the present disclosure, the position maintaining portion is in an arc shape along the rim of the pulley. A portion of the belt which is not yet fitted in the pulley groove is close to the rim of the jig-attached pulley near the end of the wrapping of the belt to the pulley. Even in this state, the belt can be maintained at a predetermined position by the position maintaining portion and the side surface of the pulley. Therefore, the belt can be advantageously prevented from being detached from the pulley over which the belt is looped in advance, and from being damaged by the twisting of the belt, until the end of the belt wrapping.

According to the sixth aspect of the present disclosure, the jig body includes a belt sandwiching portion which is apart from the belt guide portion, with a space therebetween. Since the belt inserted in the space is sandwiched between the belt sandwiching portion and the belt guide portion, the belt is fixed to the belt attachment jig when the belt is wrapped around the pulley. It is therefore possible to prevent the belt from slipping on the belt attachment jig as the pulley is rotated, and possible to attach the belt to the pulleys with efficiency and reliability.

According to the seventh aspect of the present disclosure, the jig body includes a belt receiving portion located around the rotational axis of the pulley on the belt lead-out side, and the belt receiving portion receives part of the belt guided by the belt guide portion and led out to the lateral side of the pulley, on the surface of the belt receiving portion which faces radially outside the pulley. Thus, the belt passes through a location off the rotational axis of the pulley. As a result, the belt does not obstruct the connection of a tool for rotating the pulley to the rotational axis of the pulley, thereby making it possible to smoothly attach the belt to the pulleys.

Further, the jig-attached pulley can be rotated easily because the belt is held radially outside the rotational axis of the pulley, and thereby only small torque is necessary to rotate the pulley due to a tension working on the belt portion led out to the lateral side of the jig-attached pulley.

According to the eighth aspect of the present disclosure, the belt attachment jig is attached to the pulley by the wedge engagement between the engagement protrusions on the back surface of the belt guide portion and the pulley grooves of the jig-attached pulley. It is thus possible to prevent the belt attachment jig from falling off from the pulley after finishing wrapping the belt to the pulley.

According to the ninth aspect of the present disclosure, the belt attachment jig is attached to the pulley by wedge engaging the engagement groove of the belt attachment jig with the flange of the jig-attached pulley. It is thus possible to prevent the belt attachment jig from falling off from the pulley after finishing wrapping the belt to the pulley.

DETAILED DESCRIPTION

An embodiment of the present disclosure will be described in detail below based on the drawings. The present disclosure is not limited to the embodiment below.

Embodiment of Invention

Figure 1:
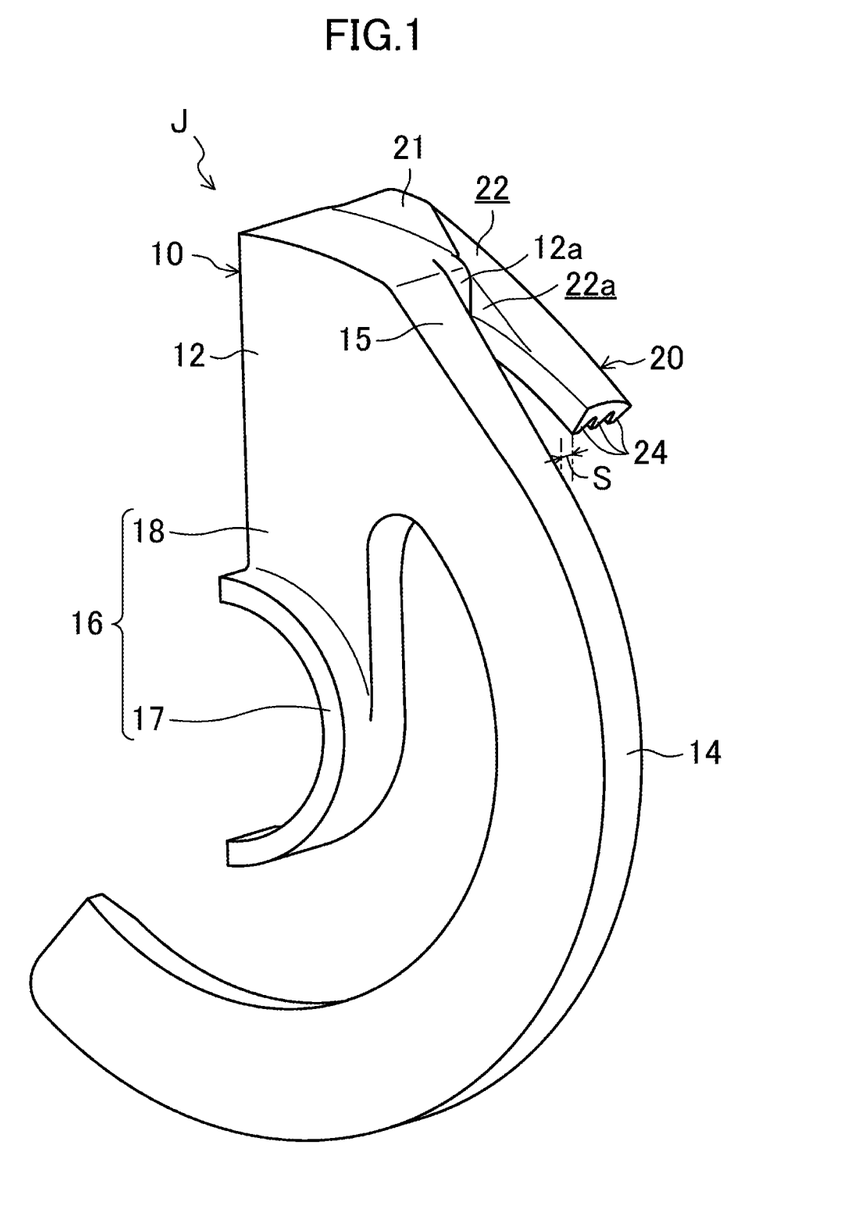
FIG. 1 is an oblique view of a belt attachment jig of an embodiment from a lateral side on the near side of a pulley.
Figure 2:
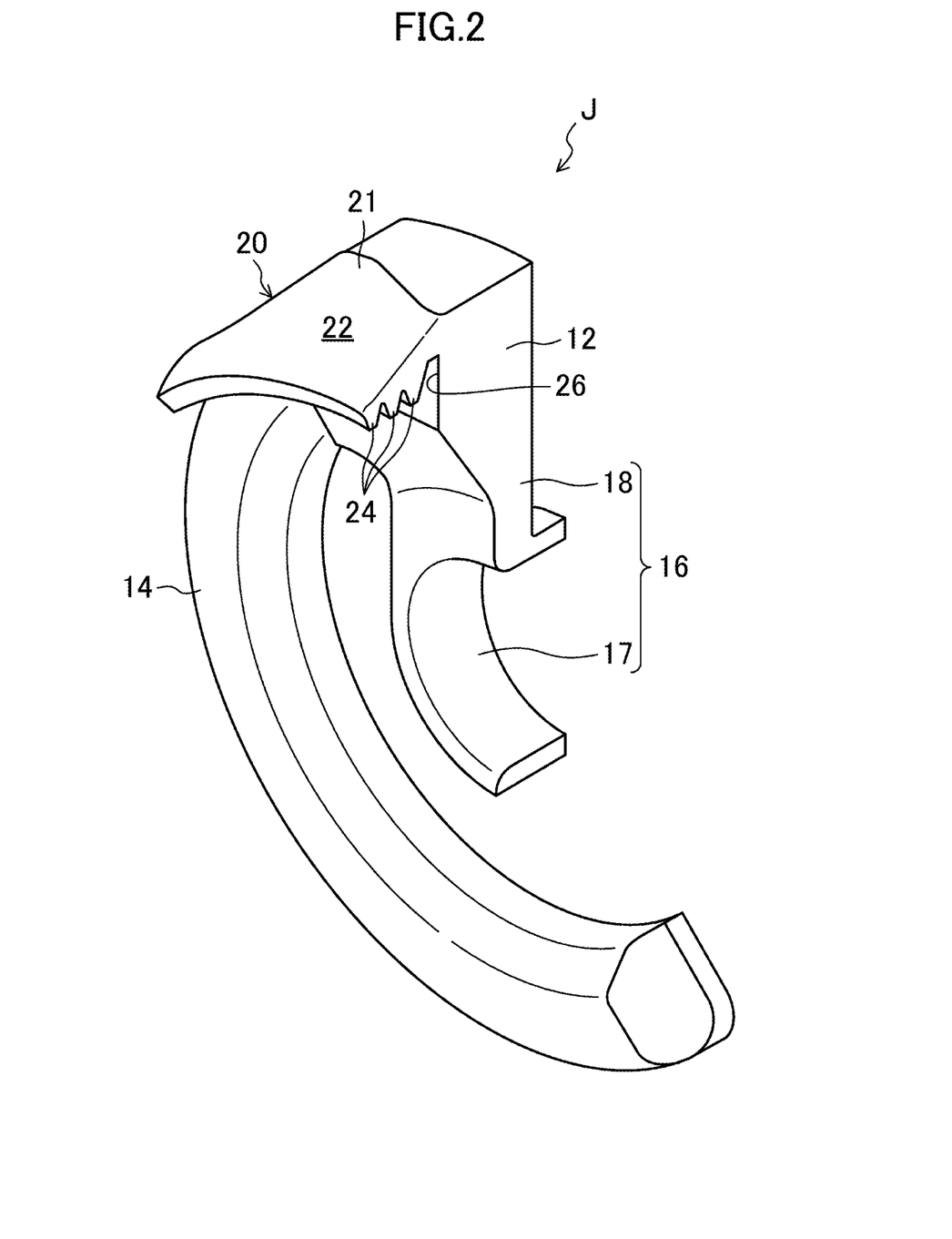
FIG. 2 is an oblique view of the belt attachment jig of the embodiment from a lateral side on the back side of the pulley.
Figure 3:
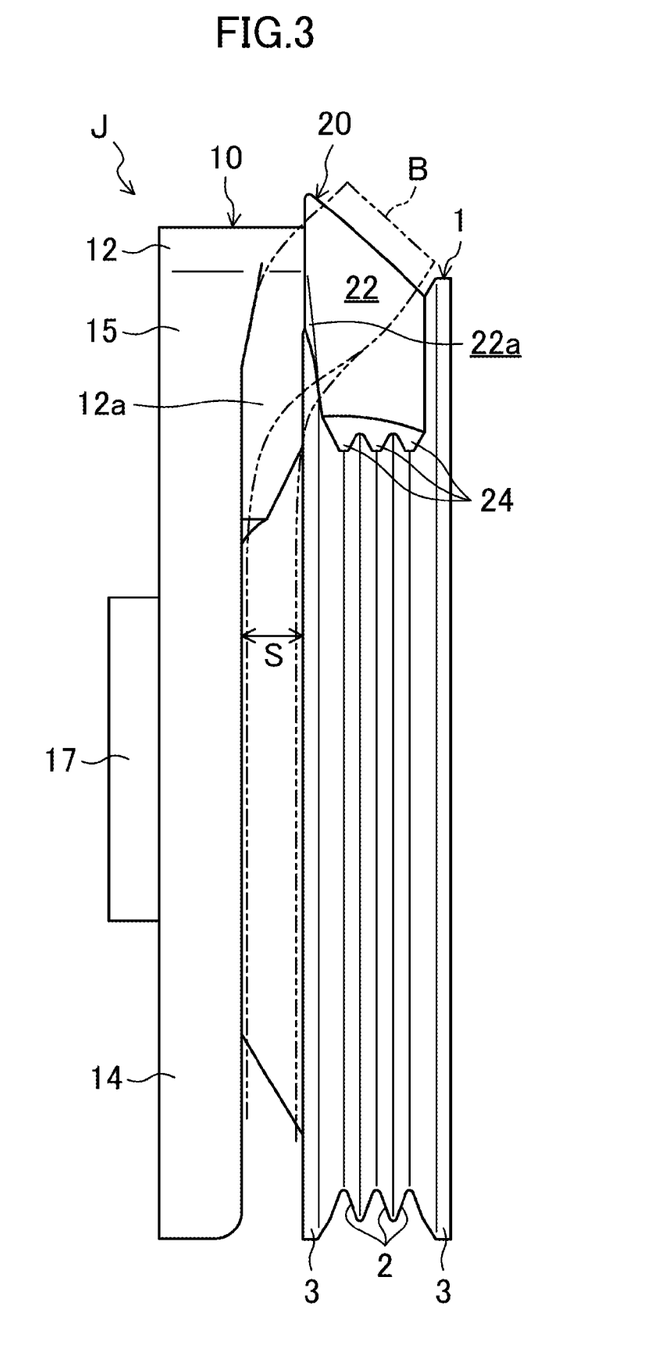
FIG. 3 is a front view of the belt attachment jig of the embodiment attached to the pulley.
Figure 4:
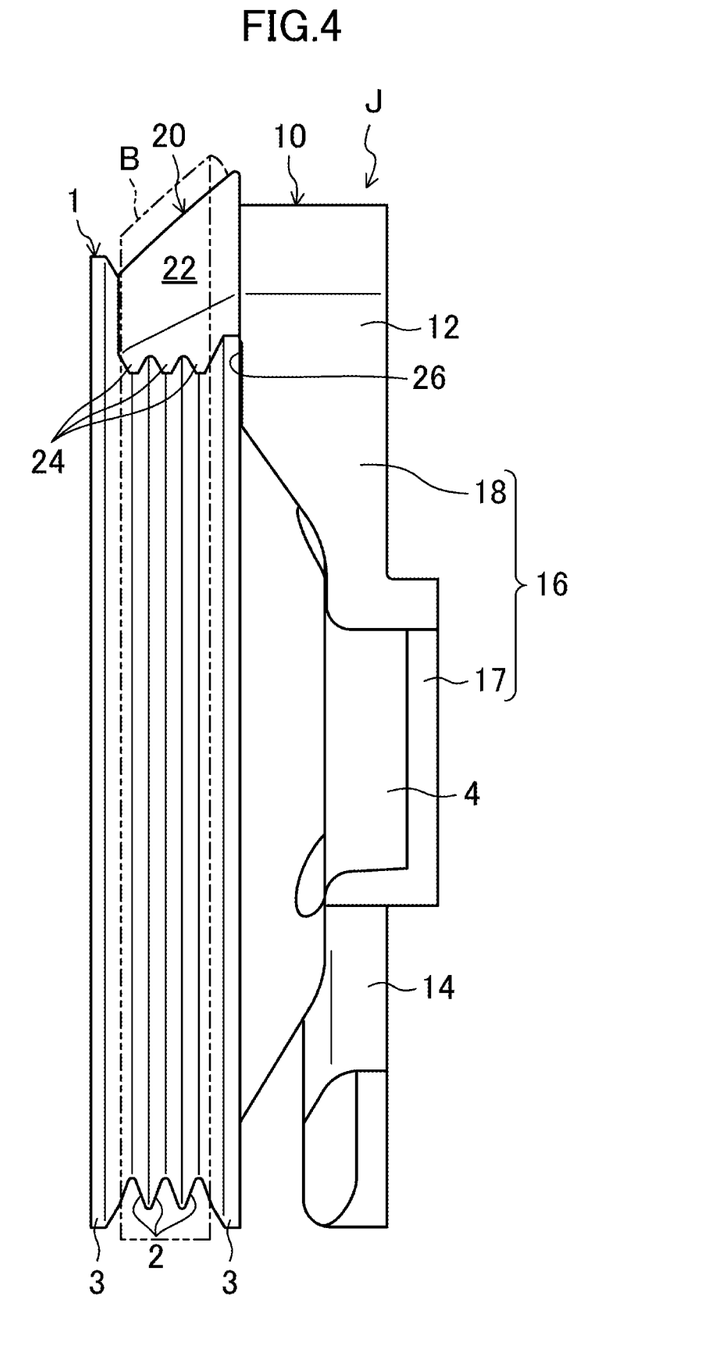
FIG. 4 is a back view of the belt attachment jig of the embodiment attached to the pulley.
Figure 5:
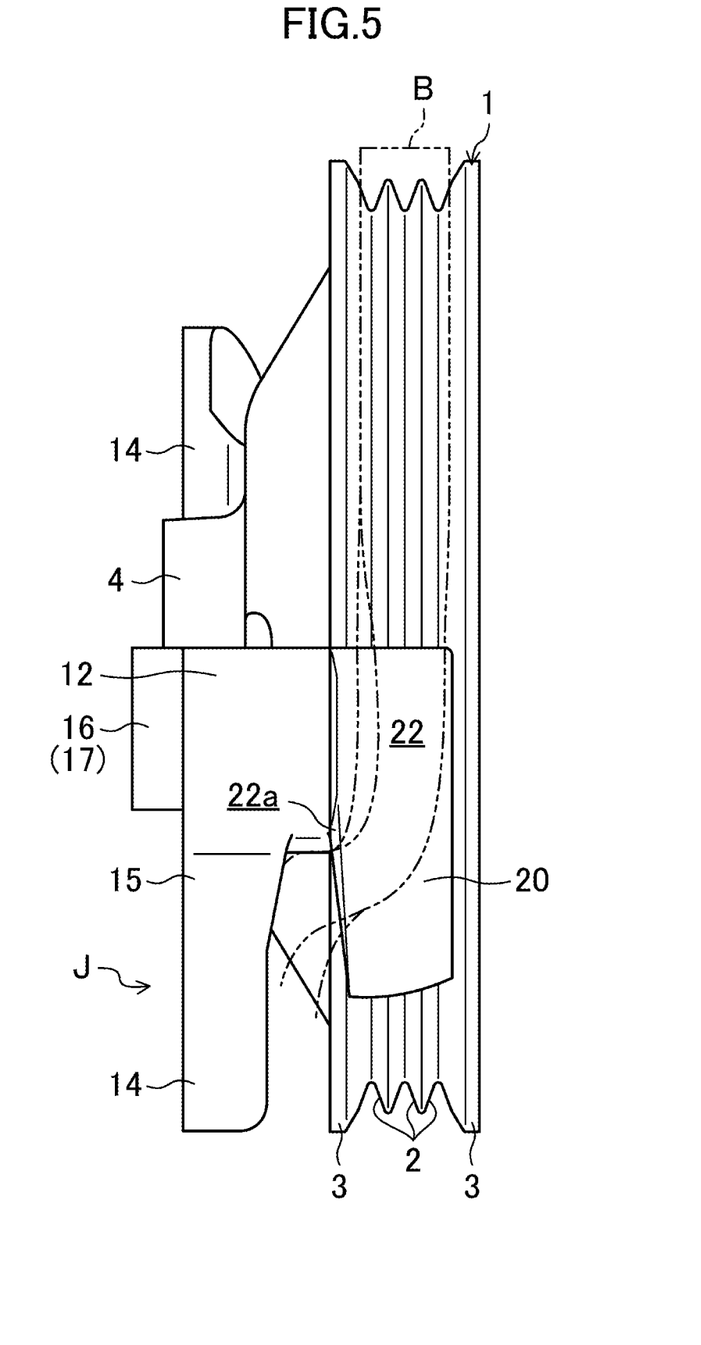
FIG. 5 is a plan view of the belt attachment jig of the embodiment attached to the pulley.
Figure 6:
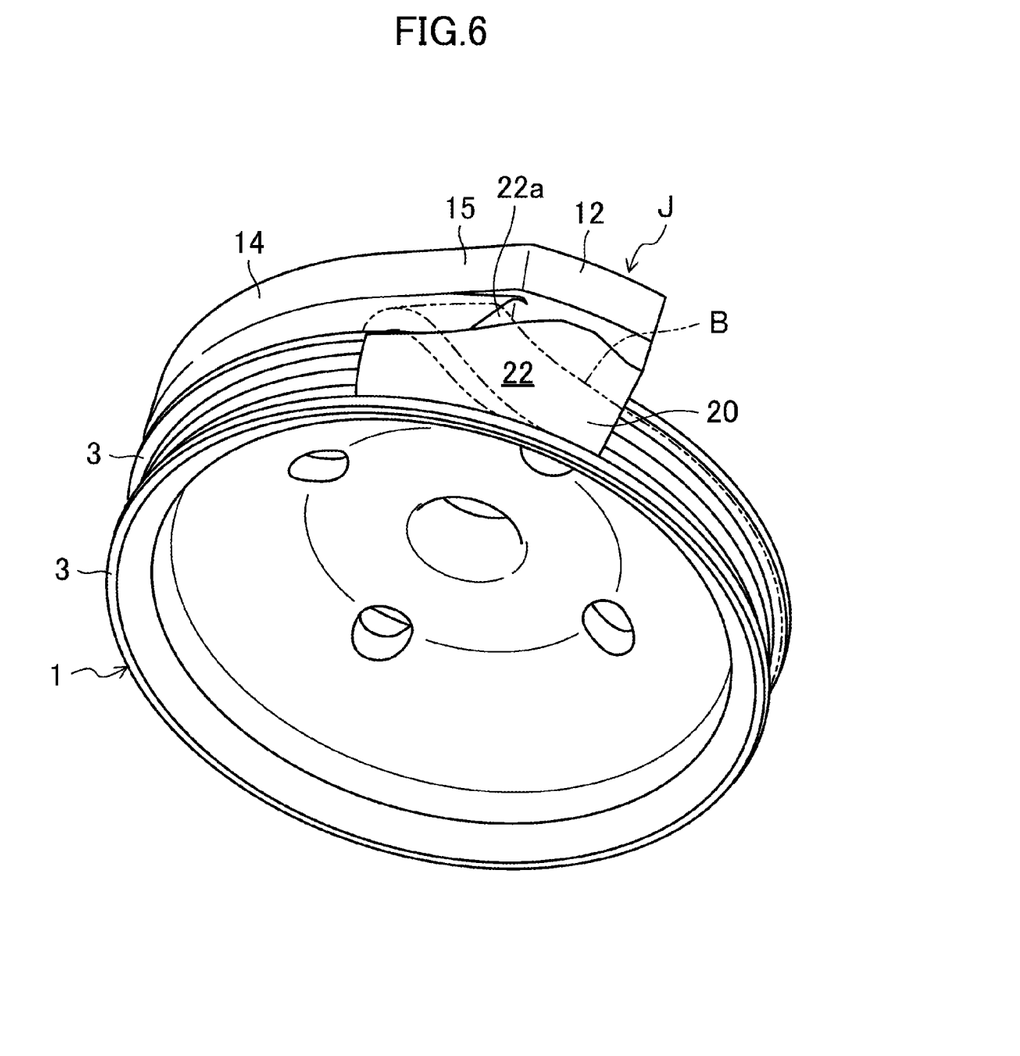
FIG. 6 is an oblique view of the belt attachment jig of the embodiment attached to the pulley and viewed from the back side of the pulley.
Figure 7:
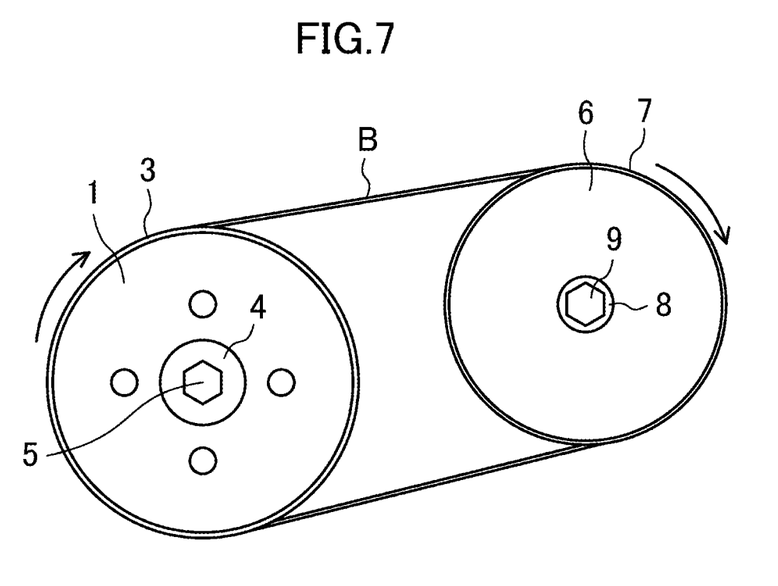
FIG. 7 is a side view showing a crank pulley and a compressor pulley around which a belt is wrapped.

FIG. 1 to FIG. 6 show a belt attachment jig J of the present embodiment. FIG. 1 is an oblique view of the belt attachment jig J, viewed from a lateral side on the near side of a pulley. FIG. 2 is an oblique view of the belt attachment jig J, viewed from a lateral side on the back side of the pulley. FIG. 3 is a front view of the belt attachment jig J attached to the pulley. FIG. 4 is a back view of the belt attachment jig J attached to the pulley. FIG. 5 is a plan view of the belt attachment jig J attached to the pulley. FIG. 6 is an oblique view of the belt attachment jig J attached to the pulley and viewed from the back side of the pulley. FIG. 7 is a side view of two pulleys 1, 6 around which a V-ribbed belt (hereinafter simply referred to as a "belt") B is wrapped using the belt attachment jig J.

As shown in FIG. 7, the belt attachment jig J of the present embodiment is used, for example, for wrapping the belt B around a crank pulley 1 coupled to a crank shaft of an engine body mounted on an engine, and around a compressor pulley 6 coupled to an input axis of an air conditioner compressor also mounted on the engine, thereby attaching the belt B to the pulleys.

Although not shown, the belt B includes a flat belt-like belt body in which a core wire made of a highly flexible fiber is buried, and a plurality of V-ribs (three V-ribs in the present embodiment) which are integrally formed in an inner circumferential surface of the belt body and protrude so as to extend in a circumferential direction of the belt. The crank pulley 1 and the compressor pulley 6 are rotatably supported, with a predetermined distance between the centers. The distance between the centers of the pulleys cannot be changed. The arrows in FIG. 7 respectively indicate the direction of rotation of the pulleys 1, 6. The engine does not have an auto tensioner (a tension applying means) which applies tension to the belt B.

As shown in FIG. 3 to FIG. 6, the crank pulley 1 includes a plurality of pulley grooves 2 (three pulley grooves in the present embodiment) in the outer circumferential surface. The pulley grooves 2 are fitted to the V-ribs on the inner circumferential surface of the belt B, and extend parallel to one another in the circumferential direction. Each of the pulley grooves 2 is in a V shape having a decreasing width from an open end to a bottom end.

The crank pulley 1 is a flange pulley. A pair of annular flanges 3 protrude at both ends of the group of pulley grooves 2 in the direction along the rotational axis of the pulley so as to sandwich the group of pulley grooves 2. The flange 3 on the near side of the crank pulley 1 is configured such that the surface facing the back side of the pulley inclines downward toward the pulley groove 2 to have a trapezoidal cross section with a decreasing width from the base end to the top end.

The crank shaft of the engine is inserted in a hub portion 4 formed in the middle of the diameter of the crank pulley 1 from the back side of the pulley, and the end of the crank shaft is fixed at the near side of the pulley with a center bolt 5.

As shown in FIG. 7, the compressor pulley 6 is also a flange pulley with annular flanges 7 protruding at both ends of the pulley in the direction along the rotational axis of the pulley. Although not shown, the compressor pulley 6 includes a plurality of V-shaped pulley grooves (three pulley grooves in the present embodiment) in the outer circumferential surface, which are fitted to the V-ribs on the inner circumferential surface of the belt B, similar to the crank pulley 1.

The input axis of the air conditioner compressor is inserted in a hub portion 8 of the compressor pulley 6 formed in the middle of the diameter of the compressor pulley 6 from the back side of the pulley, and the end of the input axis is fixed at the near side of the pulley with a center bolt 9.

The belt attachment jig J is used by being attached to one of the crank pulley 1 or the compressor pulley 6. In the present embodiment, the belt attachment jig J attached to the crank pulley 1 will be described as an example.

The belt attachment jig J is an integrally-formed jig made of resin, such as mono cast (MC) nylon and polypropylene, and includes, as shown in FIG. 1 to FIG. 6, a jig body 10 positioned such that a side surface thereof faces a side surface of the crank pulley 1, and a belt guide portion 20 located at one end of the side surface of the jig body 10, the one end being located outward in the radial direction of the pulley, and the belt guide portion 20 protruding forward in the pulley rotational direction along the circumference of the crank pulley 1. The belt guide portion 20 guides the belt B such that the belt B is led out laterally from the outer circumferential surface of the jig-attached crank pulley 1 to the near side of the pulley 1.

As shown in FIG. 1, the jig body 10 includes: a body base 12, which is a protrusion base of the belt guide portion 20; a position holding plate 14, which is an arc-shaped position maintaining portion provided at the body base 12 and protruding forward in the pulley rotational direction along the rim of the crank pulley 1; and a belt receiving portion 16 extending inward in the radial direction of the pulley from the body base 12 and located around the rotational axis of the crank pulley 1 on the side closer to the position holding plate 14.

As shown in FIG. 4, the body base 12 includes a side surface which follows the shape of a near-side side surface of the crank pulley 1 and faces the side surface of the pulley 1 so that the body base 12 comes in contact with the side surface of the crank pulley 1 at least at a portion located outward in the radial direction of the pulley. The body base 12 may include a recessed portion in a central portion of the side surface side (i.e., the right side of FIG. 4) or the rear side (i.e., the front side when viewed perpendicular to the paper plane of FIG. 4), for example. The provision of the recessed portion in the body base 12 allows a reduction in weight of the belt attachment jig J, while maintaining the strength of the body base 12.

As shown in FIG. 1 and FIG. 3, a belt-lead-out side edge of the body base 12 forms a side-surface contact portion 12a with which the side surface of the belt B on the rear side in the pulley rotational direction comes in contact when the belt B is guided by the belt guide portion 20 and led out to the lateral side of the crank pulley 1. This configuration enables the belt B to curve along the side-surface contact portion 12a when the belt B is led out to the lateral side of the crank pulley 1, and enables positioning of the belt B.

As shown in FIG. 1 and FIG. 2, the position holding plate 14 has a shape of a major arc extending along more than half the circumference of the flange 3 of the crank pulley 1. As shown in FIG. 1 and FIG. 3, the position holding plate 14 is apart from the belt guide portion 20 in the direction along the rotational axis of the pulley, with a space S between the position holding plate 14 and the belt guide portion 20. The belt B is inserted in the space S. The belt B guided in the space S is sandwiched between the position holding plate 14 and the side surface of the crank pulley 1, and held between them, with the inner circumferential surface of the belt B facing the crank pulley 1.

The base end side of the position holding plate 14 extends along the belt guide portion 20, and a portion of the position holding plate 14 located outward in the radial direction of the pulley forms a belt sandwiching portion 15. The belt B inserted in the space S between the belt sandwiching portion 15 and the belt guide portion 20 is sandwiched between the belt sandwiching portion 15 and the belt guide portion 20. This configuration enables the belt B to be attached to the belt attachment jig J.

The position holding plate 14, too, may include a recessed portion in a central portion of the side surface side (i.e., the front side when viewed perpendicular to the paper plane of FIG. 1). The provision of the recessed portion in the position holding plate 14 allows a reduction in weight of the belt attachment jig J, while maintaining the strength of the position holding plate 14.

As shown in FIG. 1, the belt receiving portion 16 includes a half arc shaped fitting portion 17 which is fitted onto the hub portion 4 of the crank pulley 1, and a connecting portion 18 which connects the fitting portion 17 and the body base 12. The belt receiving portion 16 is configured to receive part of the belt B guided by the belt guide portion 20 and led out to the lateral side of the crank pulley 1, on the surface facing radially outside the pulley and closer to the position holding plate 14. The fitting portion 17 protrudes from the other part of the jig body 10 in a direction away from the belt guide portion 20, and is wide in the rotational axis of the pulley, to ensure positioning of the fitting portion 17 onto the hub portion 4 when the fitting portion 17 is fitted on the hub portion 4 of the crank pulley 1.

The width of the belt guide portion 20 is approximately the same as the width between the flanges 3 of the crank pulley 1. The belt guide portion 20 has, on its back surface, a plurality of engagement protrusions 24 (three engagement protrusions in the present embodiment) which engage with the pulley grooves 2 of the crank pulley 1. Each of the engagement protrusions 24 has a trapezoidal cross section corresponding to the pulley groove 2 and is wedge engaged with the pulley groove 2.

In the present embodiment, each of the engagement protrusions 24 has a trapezoidal cross section. However, each of the engagement protrusions 24 may have an approximately triangular cross section so that the engagement protrusion 24 can be wedge engaged with the pulley groove 2.

As shown in FIG. 2 and FIG. 4, an engagement groove 26 which sandwiches the near-side flange 3 of the crank pulley 1 is formed between the body base 12 of the jig body 10 and a back surface of the base end side of the belt guide portion 20. The engagement groove 26 and the near-side flange 3 of the crank pulley 1 are wedge engaged with each other.

The base end of the belt guide portion 20 has a tilted surface tilting upward toward the connected portion at which the belt guide portion 20 is connected to the jig body 10. The base end of the belt guide portion 20 forms a belt holding portion 21, part of which protrudes outward in the radial direction of the pulley from the body base 12. The belt holding portion 21 has a holding surface 22 on its surface, for holding the belt B. As shown in FIG. 3, FIG. 5 and FIG. 6, the belt guide portion 20, when fitted to the pulley grooves 2 of the crank pulley 1, guides the belt B onto the holding surface 22 and then into the space S between the belt guide portion 20 and the position holding plate 14, and leads the belt B laterally out to the near side of the crank pulley 1.

The holding surface 22 has a top at the middle portion of the part connecting to the body base 12, and is tilted obliquely downward in radial directions from the top. The holding surface 22 also forms a curved surface which is curved in an inverted U shape along the lead-out direction of the belt B. This structure can prevent the belt B from being detached from the belt attachment jig J and damaged by local compression and tension while the belt B is wrapped around the crank pulley 1.

Specifically, when the belt B is held on the holding surface 22 forming such a curved surface as described above, the inner circumferential surface of the belt B faces toward the jig body 10 on the holding surface 22, and the belt B is curved into a positive bending state in which the belt B is curved along the belt lengthwise direction, following the curved shape of the holding surface 22, and is led out laterally to the near side of the crank pulley 1, as shown in FIG. 3, FIG. 5 and FIG. 6. Therefore, it is possible to reduce bending of the belt B in the belt width direction in the state where the belt B is led out to the near side of the crank pulley 1. As a result, it is possible to prevent the compressive force and the tensile force from being locally applied to the bent part of the lead-out portion of the belt B.

Since the holding surface 22 is upwardly tilted toward the jig body 10, the belt B held on the holding surface 22 is pushed against the holding surface 22 and hung thereon, even when the belt B is wrapped around the pulleys by rotating the crank pulley 1 and is led out laterally to the near side of the pulley due to the tension applied to the belt B as the belt B is wrapped around. Thus, the belt B can be reliably held on the holding surface 22, and prevented from being detached from the belt attachment jig J to the near side of the pulley.

The belt-lead-out side edge of the holding surface 22 forms a belt bending reducing surface 22a which is tilted downward toward the belt lead-out side as shown in FIG. 1, FIG. 3 and FIG. 5. The belt bending reducing surface 22a reduces the bending of the lead-out portion of the belt B held on the holding surface 22. As a result, the belt B can be bent from the holding surface 22 and led out smoothly to the lateral side of the crank pulley 1, without causing intense bending of the belt B.

The tip side surface of the belt guide portion 20 forms an inverted U-shaped surface which is gently curved downward away from the position holding plate 14 as shown in FIG. 3. This gently-curved surface allows the belt B to be smoothly fitted in the pulley groove 2 by letting the belt B be slipped toward the back side of the pulley when the belt B rides on the tip side surface of the belt guide portion 20.

As will be described in detail later, in the belt attachment jig J having the above configurations, the belt B is looped over the compressor pulley 6, and in this state, the belt guide portion 20 is fitted in the pulley groove 2 of the crank pulley 1, and the belt B is held on the holding surface 22. The crank pulley 1 is rotated to move the belt attachment jig J in the pulley rotational direction together with the belt B, thereby making the belt B fitted in the pulley groove 2 and attached to the crank pulley 1.

—Method of Use—

Figure 9A:
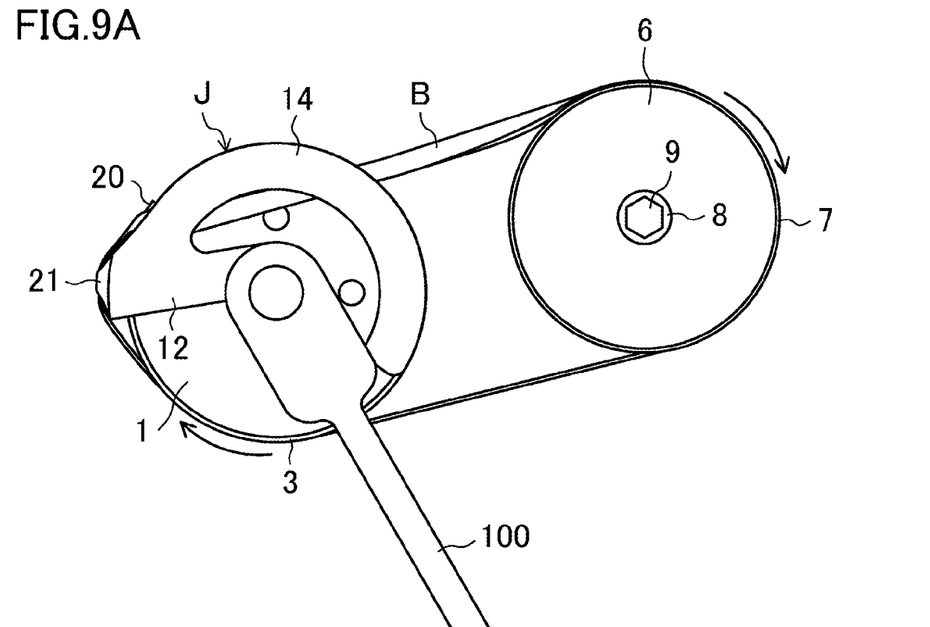
FIG. 9A and FIG. 9B are side views showing a second half step of attaching the belt according to the embodiment.
Figure 9B:
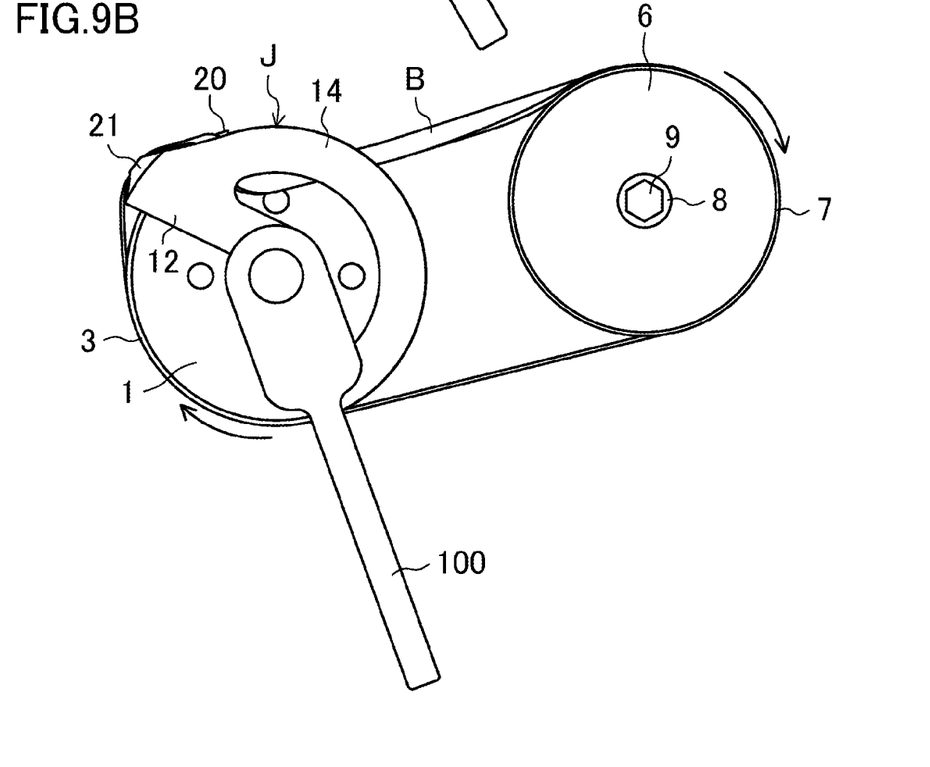
Figure 10:
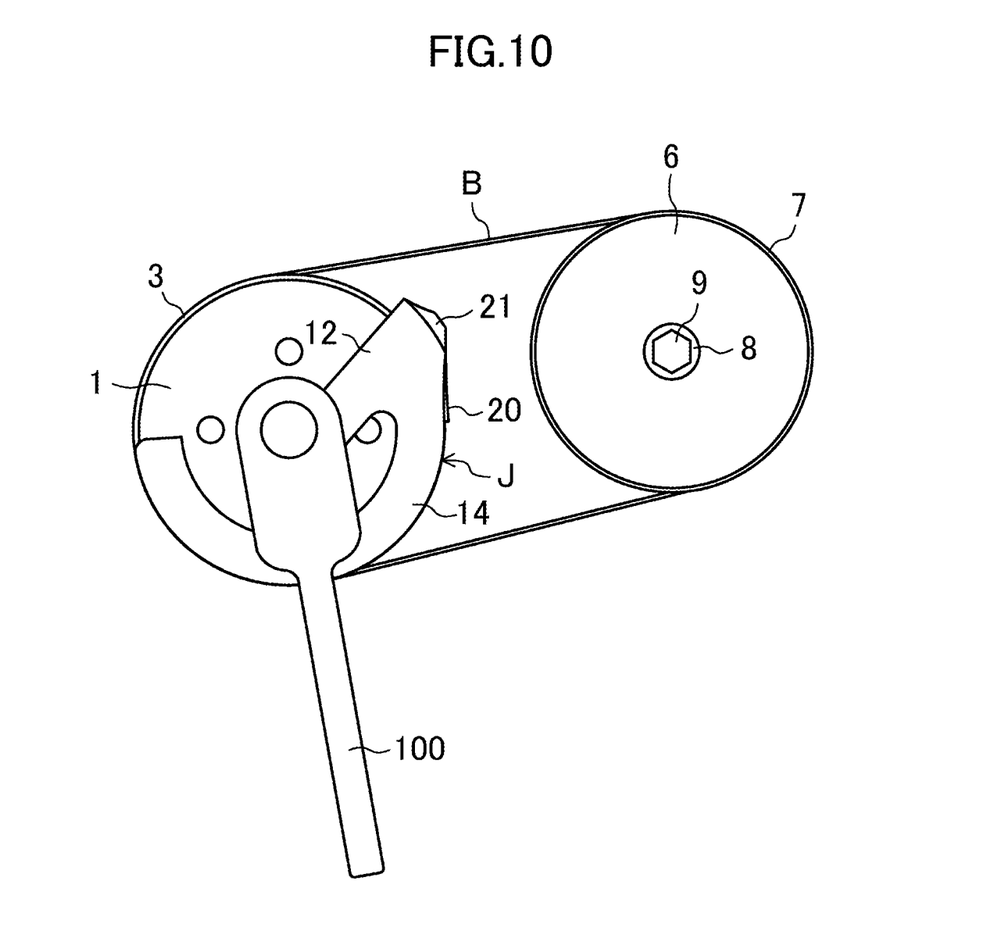
FIG. 10 is a side view showing a state in which the wrapping of the belt in the embodiment is finished.

Now, example steps of attaching the belt B to the crank pulley 1 and the compressor pulley 6 using the belt attachment jig J will be described with reference to FIG. 8 to FIG. 10. FIG. 8 is a side view showing a first half step of attaching the belt. FIG. 9 is a side view showing a second half step of attaching the belt. FIG. 10 is a side view showing a state in which the wrapping of the belt around the crank pulley 1 is finished. The arrows in FIG. 9 indicate the directions of rotation of the pulleys 1, 6.

Figure 8A:
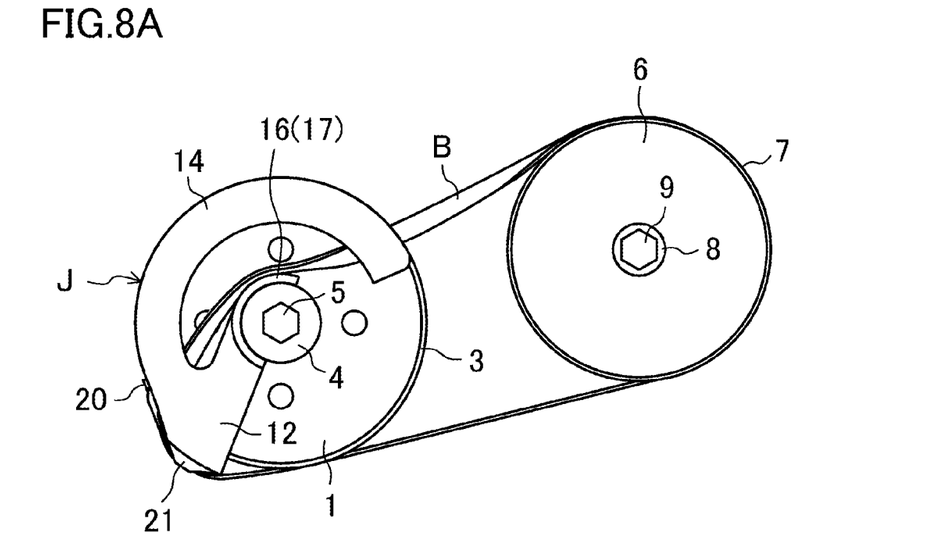
FIG. 8A and FIG. 8B are side views showing a first half step of attaching the belt according to the embodiment.

To attach the belt B to the crank pulley 1 and the compressor pulley 6 using the belt attachment jig J, as shown in FIG. 8A, one side of the belt B is looped over the compressor pulley 6, and the other side of the belt B is made to pass through the back side of the belt holding portion 21 and wound around the holding surface 22, and is made to pass through the space S between the position holding plate 14 and the belt guide portion 20 to be sandwiched between the belt sandwiching portion 15 and the belt guide portion 20, thereby fixing the belt B to the belt attachment jig J.

A portion of the belt B located on the rear side of the holding surface 22 in the pulley rotational direction is fitted to the pulley groove 2 of the crank pulley 1. A portion of the belt B passed through the space S located on the forward side of the holding surface 22 in the pulley rotational direction is sandwiched between the near-side surface of the crank pulley 1 and the position holding plate 14 such that the inner circumferential surface of the belt B faces the crank pulley 1, and the belt B is led out laterally to the near-side of the pulley 1. As a result, the belt B is held on the holding surface 22, and the belt holding portion 21 is sandwiched between the pulley groove 2 of the crank pulley 1 and the belt B, thereby attaching the belt attachment jig J to the crank pulley 1.

When the belt B is held on the holding surface 22 by the attachment step described above, the inner circumferential surface of the belt B faces the jig body 10 on the holding surface 22, and the belt B is curved into a positive bending state, following the curved shape of the holding surface 22, and is led out laterally to the near side of the crank pulley 1, as shown in FIG. 3, FIG. 5 and FIG. 6. Therefore, it is possible to reduce bending of the belt B in the belt width direction, and possible to prevent the compressive force and the tensile force from being locally applied to the bent part of the lead-out portion of the belt B.

In the above attachment step, not much tension is applied to the belt B. Therefore, the belt B can be easily wrapped around the crank pulley 1. The side surface or the outer circumferential surface of the belt portion led out laterally to the near side of the crank pulley 1 is received on the belt receiving portion 16 so that the belt B passes outside the hub portion 4 in the radial direction of the pulley.

In the above attachment state of the belt attachment jig J, the belt B is fixed between the near-side surface of the crank pulley 1 and the position holding plate 14, and the belt guide portion 20 is sandwiched between the fixed belt B and the pulley groove 2. Therefore, the belt attachment jig J is firmly engaged with and fixed to the crank pulley 1 in relation to the belt attachment jig J, the crank pulley 1, and the belt B.

Figure 8B:
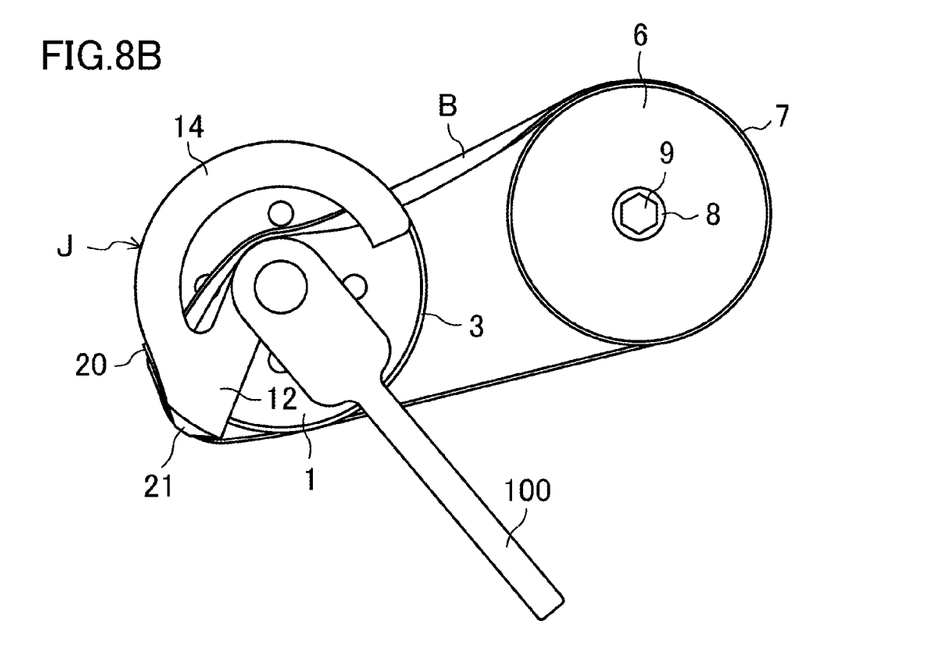

Next, as shown in FIG. 8B, a wrench 100 is connected to the center bolt 4 of the crank pulley 1 to which the belt attachment jig J is attached, so that the crank pulley 1 can be rotated by hand. Since the belt B is received on the belt receiving portion 16 and passes outside the hub portion 5 of the crank pulley 1 in the radial direction of the pulley, the belt B does not obstruct the connection of the wrench 100 to the center bolt 5, thereby making it possible to connect the wrench 100 smoothly.

Next, the crank pulley 1 is rotated clockwise as viewed in FIG. 8B, using the wrench 100. As a result, as shown in FIG. 9A, the belt attachment jig J moves forward in the pulley rotational direction, gradually increasing the area of the belt B which is fitted in the pulley groove 2. The crank pulley 1 can be rotated easily at this time because only small torque is necessary to rotate the crank pulley 1 due to a tension working on the part of the belt B led out to the lateral side of the crank pulley 1 and received on the belt receiving portion 16. Further, the belt B does not slip on the belt attachment jig J when the crank pulley 1 is rotated, because the belt B is fixed to the belt attachment jig J due to the belt sandwiching portion 15 and the belt guide portion 20.

A force laterally toward the near side of the pulley is applied to the belt holding portion 21 when the belt B is wrapped around the crank pulley 1. However, the belt holding portion 21 is pushed against the pulley groove 2 by the belt B, and the engagement groove 26 is wedge engaged with the near-side flange 3 of the crank pulley 1. Thus, the inclination of the belt attachment jig J is regulated, and the inner circumferential surface of the belt B is pushed onto the holding surface 22 and hung thereon. Accordingly, the belt attachment jig J is attached to the crank pulley 1 until the end of the wrapping of the belt B around the crank pulley 1.

With the rotation of the crank pulley 1, a portion of the belt B which is located on the forward side of the holding surface 22 in the pulley rotational direction and laterally toward the near side of the crank pulley 1, is moved radially outward from near a center portion of the crank pulley 1, and gradually approaches the rim of the near-side flange 3 of the crank pulley 1. The portion of the belt B is close to the rim of the pulley flange 3 near the end of the wrapping of the belt B around the crank pulley 1 as shown in FIG. 9B. Even in this state, the position of the belt B can be maintained by the near-side surface of the crank pulley 1 and the position holding plate 14 because the position holding plate 14 is located close to the rim of the crank pulley 1.

Due to the tension applied to the belt B during the wrapping, the belt B entering to the compressor pulley 6 is pulled hard to the near side of the pulley. However, the belt B guided in the space S between the position holding plate 14 and the belt guide portion 20 is sandwiched and held between near-side surface of the crank pulley 1 and the position holding plate 14 such that the inner circumferential surface of the belt B faces the crank pulley 1. Accordingly, a portion of the belt B which is not yet wrapped around the pulley groove 2 of the crank pulley 1 is in a state in which one side of the belt B in its width direction that is to be delivered to the near side on the outer circumferential surface of the pulley 1, 6 is closer to the rotational axis of the pulley than the other side of the belt B in its width direction that is to be delivered to the back side on the outer circumferential surface of the pulley 1, 6. Therefore, a portion of the belt B which is located on the near side of the compressor pulley 6 firmly engages with the pulley groove and the flange 7 of the pulley 6. As a result, the belt B is prevented from being detached from the pulley 6. The belt B is also reliably prevented from being twisted on the near-side surface of the crank pulley 1 where the belt B tends to be twisted due to sliding during the rotation of the crank pulley 1, and therefore prevented from being damaged on the belt back surface.

When the crank pulley 1 is further rotated, the belt B eventually moves out of the space S between the position holding plate 14 and the belt guide portion 20 and rides on the top surface of the belt guide portion 20. Then, the belt B passes through the tip side surface of the belt guide portion 20, and slides into the pulley groove 2 and is completely engaged with the pulley groove 2. As a result, the belt B is correctly wrapped around the crank pulley 1.

The rotation of the crank pulley 1 is stopped when the belt attachment jig J is separated from the belt B and positioned at a location between the crank pulley 1 and the compressor pulley 6 as shown in FIG. 10. In this state, as well, the belt attachment jig J is engaged with and fixed to the crank pulley 1 due to the wedge engagement between the engagement protrusion 24 on the back surface of the belt guide portion 20 and the pulley groove 2, and the wedge engagement between the near-side flange 3 of the crank pulley 1 and the engagement groove 26. Thus, the belt attachment jig J does not fall off from the crank pulley 1 and stays attached to the pulley 1.

After that, the wrench 100 is detached from the center bolt 5 of the crank pulley 1, and the belt attachment jig J is removed from the crank pulley 1 to finish the attachment of the belt B to the crank pulley 1 and the compressor pulley 6.

In this manner, the belt B can be wrapped around the crank pulley 1 and the compressor pulley 6 in a tight belt tension.

Advantages of Embodiment

In the present embodiment, the holding surface 22 of the belt attachment jig J for holding the belt B has a top at a middle portion of the part connecting to the jig body 10, and is tilted obliquely downward in radial directions from the top, and the holding surface 22 forms a curved surface which is curved in an inverted U shape along a lead-out direction of the belt. This structure can prevent the belt B from being detached from the belt attachment jig J and damaged by local compression and tension while the belt B is attached to the crank pulley 1 and the compressor pulley 6.

In the above embodiment, the holding surface 22 has a top at a middle portion of the part connecting to the body base 12, and is tilted obliquely downward in radial directions from the top. However, the present disclosure is not limited to this structure. For example, the holding surface 22 may have a top at a portion on the forward side in the pulley rotational direction, or a portion on the rear side in the pulley rotational direction, of the part connecting to the body base 12, and be tilted obliquely downward in radial directions from that top. Any structure may be applied to the holding surface 22 as long as the holding surface 22 has a top at a portion on the side closer to the jig body 10 and is tilted obliquely downward in radial directions from the top, and is curved in an inverted U shape along the lead-out direction of the belt B so that the inner circumferential surface of the belt B faces the jig body 10.

In the above embodiment, the position holding plate 14 holds the belt B guided into the space S between the position holding plate 14 and the belt guide portion 20, by sandwiching the belt B between the position holding plate 14 and the near-side surface of the crank pulley 1. However, the position holding plate 14 is not limited to this structure. The position holding plate 14 may be configured such that the belt B is loosely inserted in the space between the position holding plate 14 and the near-side surface of the crank pulley 1 so that the belt B can be slightly twisted in the space. The position holding plate 14 may have any structure that can hold the belt B by the position holding plate 14 and the near-side surface of the jig-attached pulley, at an angle at which a portion of the belt B closer to the near side of the other pulley, to which the belt B is delivered from the jig-attached pulley, can be firmly fixed to the pulley groove and the flanges of the other pulley, and that can regulate twisting of the belt B to prevent the back surface of the belt B from touching the near-side surface of the jig-attached pulley.

Specifically, in the above embodiment, the position holding plate 14 has a shape of a major arc extending along more than half the circumference of the flange 3 of the crank pulley 1. However, the present disclosure is not limited to this structure. The position holding plate 14 may be configured to be in a minor arc shape extending along less than half the flange 3 of the crank pulley 1, or does not need to be in a shape extending along the flange 3 of the crank pulley 1.

The foregoing embodiment is a preferred example, and a technical scope of the present disclosure is not limited to the scope of the above embodiment. It is understood by a person skilled in the art that the above embodiment is an example, that there may be more variations in the structural elements and the method of use, and that such variations are also within the scope of the present disclosure.

For example, in the above embodiment, the belt attachment jig J attached to the crank pulley 1 has been described as an example. However, the belt attachment jig J may also be attached to the compressor pulley 6.

In the above embodiment, an example in which the belt B is wrapped around two pulleys, i.e., the crank pulley 1 and the compressor pulley 6 is described, but of course, the belt attachment jig J of the present disclosure may also be used for wrapping the belt B around three pulleys or more.

In the above embodiment, a V-ribbed belt B is described as an example of the belt wrapped around the pulleys 1, 6. However, the belt to which the belt attachment jig J of the present disclosure is applicable is not limited to the V-ribbed belt B, but may also be a belt, such as a flat belt and a V belt, in addition to V-ribbed belts.

As described above, the present disclosure is useful as a belt attachment jig used to attach a belt to a plurality of pulleys by wrapping the belt around the pulleys, and especially suitable as a belt attachment jig required to prevent the belt from being detached from the belt attachment jig, and prevent the belt from being damaged by local compression and tension of the belt.

What is claimed is:

1. A belt attachment jig comprising:
a jig body positioned such that a side surface thereof faces a side surface of a pulley, and
a belt guide portion located at one end of the side surface of the jig body and protruding along a circumference of the pulley, and having, in a surface on a base side thereof, a holding surface for holding a belt, the belt guide portion being configured to guide the belt onto the holding surface and lead the belt out to a lateral side of the pulley, when fitted in a pulley groove of the pulley, and
the belt attachment jig being used for wrapping the belt around at least two pulleys in a tight tension and attaching the belt to one of the at least two pulleys by fitting the belt guide portion in the pulley groove of the one pulley and holding the belt on the holding surface, with the belt looped over the other pulley, and fitting the belt in the pulley groove by moving the belt attachment jig in a pulley rotational direction together with the belt as the pulley is rotated, wherein
the holding surface has a top at a middle portion of a part connecting the jig body the belt guide portion, and is tilted obliquely downward in radial directions from the top so that an inner circumferential surface of the belt faces the jig body, and the holding surface also serves as a detachment preventing portion that is curved in an inverted U shape in a convex manner away from the jig body along a lead-out direction of the belt to prevent the belt from being detached toward the jig body.

2. The belt attachment jig of claim 1, wherein
a belt-lead-out side edge of the holding surface forms a belt bending reducing surface which is tilted downward toward a belt lead-out side and reduces bending of a lead-out portion of the belt held on the holding surface.

3. The belt attachment jig of claim 1, wherein
a belt-lead-out side edge of the jig body at a protrusion base of the belt guide portion forms a side-surface contact portion with which a side surface of the belt on a rear side in the pulley rotational direction comes in contact, and along which the side surface of the belt is aligned, when the belt is guided by the belt guide portion and led out to the lateral side of the pulley.

4. The belt attachment jig of claim 1, wherein
the jig body includes a position maintaining portion provided at the protrusion base of the belt guide portion and protruding forward in the pulley rotational direction along a side surface of the pulley, the position maintaining portion being apart from the belt guide portion in a direction of a rotational axis of the pulley, with a space between the position maintaining portion and the belt guide portion, and holding the belt guided into the space, between the position maintaining portion and the side surface of the pulley, such that the inner circumferential surface of the belt faces the pulley.

5. The belt attachment jig of claim 4, wherein
the position maintaining portion is in an arc shape along a rim of the pulley.

6. The belt attachment jig of claim 1, wherein
the jig body includes a belt sandwiching portion that is apart from the belt guide portion in the direction of the rotational axis of the pulley, with a space between the belt sandwiching portion and the belt guide portion, and sandwiches the belt inserted in the space, between the belt sandwiching portion and the belt guide portion.

7. The belt attachment jig of claim 1, wherein
the jig body includes a belt receiving portion located around the rotational axis of the pulley on the belt lead-out side, and receiving part of the belt guided by the belt guide portion and led out to the lateral side of the pulley, on a surface locating radially outside the pulley.

8. The belt attachment jig of claim 1, wherein
the pulley groove of each of the pulleys includes a plurality of pulley grooves arranged in parallel with each other, and each of the pulley grooves is in a V shape having a decreasing width from an open end to a bottom end,
the belt guide portion has, on a back surface thereof, a plurality of engagement protrusions which engage with the pulley grooves, and
each of the engagement protrusions has a triangular or trapezoidal cross section to correspond to each of the pulley grooves.

9. The belt attachment jig of claim 1, wherein
an engagement groove which sandwiches and engages with a flange of the pulley to which the belt attachment jig is attached, the flange having a trapezoidal cross section with a decreasing width from a base end to a top end, is formed between the one end of the jig body and the surface of the belt guide portion on its base side.

10. A belt attachment jig comprising:
a jig body positioned such that a side surface thereof faces a side surface of a pulley, and
a belt guide portion located at one end of the side surface of the jig body and protruding along a circumference of the pulley, and having, in a surface on a base side thereof, a holding surface for holding a belt, the belt guide portion being configured to guide the belt onto the holding surface and lead the belt out to a lateral side of the pulley, when fitted in a pulley groove of the pulley, and the belt attachment jig being used for wrapping the belt around at least two pulleys in a tight tension and attaching the belt to one of the at least two pulleys by fitting the belt guide portion in the pulley groove of the one pulley and holding the belt on the holding surface, with the belt looped over the other pulley, and fitting the belt in the pulley groove by moving the belt attachment jig in a pulley rotational direction together with the belt as the pulley is rotated, the holding surface having a top at a portion on a side closer to the jig body, and being tilted obliquely downward in radial directions from the top and being curved in an inverted U shape along a lead-out direction of the belt so that an inner circumferential surface of the belt faces the jig body, the jig body including a position maintaining portion provided at the protrusion base of the belt guide portion and protruding forward in the pulley rotational direction along a side surface of the pulley, the position maintaining portion being apart from the belt guide portion in a direction of a rotational axis of the pulley, with a space between the position maintaining portion and the belt guide portion, and holding the belt guided into the space, between the position maintaining portion and the side surface of the pulley, such that the inner circumferential surface of the belt faces the pulley.

11. The belt attachment jig of claim 10, wherein the position maintaining portion is in an arc shape along a rim of the pulley.

12. A belt attachment jig comprising:

a jig body positioned such that a side surface thereof faces a side surface of a pulley, and a belt guide portion located at one end of the side surface of the jig body and protruding along a circumference of the pulley, and having, in a surface on a base side thereof, a holding surface for holding a belt, the belt guide portion being configured to guide the belt onto the holding surface and lead the belt out to a lateral side of the pulley, when fitted in a pulley groove of the pulley, and the belt attachment jig being used for wrapping the belt around at least two pulleys in a tight tension and attaching the belt to one of the at least two pulleys by fitting the belt guide portion in the pulley groove of the one pulley and holding the belt on the holding surface, with the belt looped over the other pulley, and fitting the belt in the pulley groove by moving the belt attachment jig in a pulley rotational direction together with the belt as the pulley is rotated, the holding surface having a top at a portion on a side closer to the jig body, and being tilted obliquely downward in radial directions from the top and being curved in an inverted U shape along a lead-out direction of the belt to prevent the belt from being detached toward the jig body, the jig body including a belt sandwiching portion that is apart from the belt guide portion in the direction of the rotational axis of the pulley, with a space between the belt sandwiching portion and the belt guide portion, and sandwiching the belt inserted in the space, between the belt sandwiching portion and the belt guide portion.

13. A belt attachment jig comprising:

a jig body positioned such that a side surface thereof faces a side surface of a pulley, and a belt guide portion located at one end of the side surface of the jig body and protruding along a circumference of the pulley, and having, in a surface on a base side thereof, a holding surface for holding a belt, the belt guide portion being configured to guide the belt onto the holding surface and lead the belt out to a lateral side of the pulley, when fitted in a pulley groove of the pulley, and the belt attachment jig being used for wrapping the belt around at least two pulleys in a tight tension and attaching the belt to one of the at least two pulleys by fitting the belt guide portion in the pulley groove of the one pulley and holding the belt on the holding surface, with the belt looped over the other pulley, and fitting the belt in the pulley groove by moving the belt attachment jig in a pulley rotational direction together with the belt as the pulley is rotated, the holding surface having a top at a portion on a side closer to the jig body, and being tilted obliquely downward in radial directions from the top and being curved in an inverted U shape along a lead-out direction of the belt so that an inner circumferential surface of the belt faces the jig body, the jig body including a belt receiving portion located around the rotational axis of the pulley on the belt lead-out side, and receiving part of the belt guided by the belt guide portion and led out to the lateral side of the pulley, on a surface located radially outside the pulley.

* * * * *